United States Patent [19]

Matsumoto et al.

[11] Patent Number: 4,483,077
[45] Date of Patent: Nov. 20, 1984

[54] DIGITAL MEASURING DEVICE

[75] Inventors: Hajime Matsumoto, Chiba; Kouji Okada; Nobuo Sano, both of Tokyo, all of Japan

[73] Assignee: Toybox Corporation, Tokyo, Japan

[21] Appl. No.: 504,868

[22] Filed: Jun. 16, 1983

[30] Foreign Application Priority Data

Jun. 17, 1982 [JP] Japan ................................. 57-11440
Jun. 17, 1982 [JP] Japan ................................. 57-11441

[51] Int. Cl.³ ....................... G01B 11/04; G01B 11/08
[52] U.S. Cl. ............................. 33/125 A; 33/137 R; 33/143 R; 33/174 D; 33/179; 116/202; 116/DIG. 26
[58] Field of Search ................. 33/1 L, 125 R, 125 A, 33/137 R, 143 R, 147 R, 174 D, 179; 340/815.31; 116/202, DIG. 5, DIG. 26

[56] References Cited

U.S. PATENT DOCUMENTS

| 3,648,276 | 3/1972 | Schuman | 33/125 A |
| 3,806,875 | 4/1974 | Georget | 340/815.31 |
| 3,820,096 | 6/1974 | Himmelsbach et al. | 116/202 |
| 3,836,911 | 9/1974 | Gibson et al. | 340/815.31 |
| 3,953,800 | 4/1976 | Nakamura et al. | 340/815.31 |
| 4,143,267 | 3/1979 | Johnson et al. | 33/137 R |
| 4,214,391 | 7/1980 | Angst | 340/815.31 |

FOREIGN PATENT DOCUMENTS

| 1548352 | 8/1969 | Fed. Rep. of Germany | 33/125 A |
| 319335 | 11/1902 | France | 33/179 |
| 7811483 | 5/1979 | Netherlands | 33/125 A |
| 2743 | 2/1914 | United Kingdom | 33/179 |

Primary Examiner—Richard R. Stearns
Attorney, Agent, or Firm—Staas & Halsey

[57] ABSTRACT

A digital measuring device having a relatively rigid slide and a flexible, substantially transparent band with opaque indicia placed thereon, the band being capable of being pulled centrally through an opening in the slide. The slide houses a plurality of optic fibers with one end of each fiber terminating at a light-receiving panel and the other end of each fiber terminating at a digital read-out panel. The ends of the fibers at the digital read-out panel are arranged to form, e.g., a generic "88" configuration, from which the digits 0-99 may be formed. In operation, the band is pulled through the opening in the slide and light passes through the transparent areas of the band and into the light receiving panel. The light continues through the optic fibers and lights up a particular digital configuration at the digital read-out panel. The slide and band may be useful e.g., as a belt-like device for measuring one's waist, or as a carpenter's tape measure.

7 Claims, 5 Drawing Figures

DIGITAL MEASURING DEVICE

BACKGROUND OF THE INVENTION

This invention relates to measuring devices, and more particularly to measuring devices having a digital read-out.

Attempts have been made to adapt digital read-out technology to conventional measuring devices. The prior art digital measuring devices usually use a self-contained light source, a light sensing means, optic fibers, and electronic apparati for translating the light energy into a digital read-out.

For example, U.S. Pat. No. 4,143,267, issued to Johnson et al., discloses a distance measuring device using a binary encoded scale on a movable tape measure, an optical detection system and an electronic circuit. The optical detection system, which decodes the binary information on the tape measure, basically comprises a self-contained light source, a plurality of light-conducting fibers and photo-transitor integrated circuits. The electronic circuit then accepts the digital code from the optical detection system, decodes it and displays the resulting information at a digital read-out.

Similarly, U.S. Pat. No. 4,161,781, issued to Hildebrandt et al., and U.S. Pat. No. 4,242,574, issued to Grant, each disclose coilable tape measures provided with a series of markings to indicate predetermined distances. Photo-electric sensor systems in the respective stationary tape housings detect shifts in light level at the illuminated markings when the tape measure is moved a particular distance. Each of these references use a battery to energize a self-contained light source.

Thus, the three above-discussed prior art devices teach the use of electronic apparati to produce light, to detect the light produced and/or to transform a light-detection signal into a digital read-out via optic fibers.

U.S. Pat. No. 3,857,361, issued to Gibson et al, also discloses the use of optic fibers with a digital read-out, but not in a distance or length measuring device. This patent discloses a UHF channel indicator for television tuners and the like to be used with a fairly conventional VHF channel indicator. Basically, this patent discloses a stationary optic fiber bundle (J), having near one end a first rotating plate (I) made up of two discs 24 and 26 each having opaque masks positioned annularly thereon, and a second rotatable plate (G) at the other end of the optic fiber bundle (J) and having both annularly positioned transparent numbers (for VHF), and a transparent window (F) to indicate UHF channel numbers formed at the ends of the bundle of fibers. The first plate is connected to the UHF dial (16) on the outside of the TV and the second plate is connected to the VHF dial (10) on the outside of the TV. Preferably, the optic fiber bundle (J) contains enough fibers to produce two separate digits adjacent the second plate (G), a tens digit and a units digit. In addition, a first light source (K) is located opposite the optic fiber bundle (J) on the far side of the first plate (I) and a second light source (H) is positioned near the second plate. In operation, a viewer first turns conventional dial (10) until the transparent window (F) is positioned adjacent the end of the optic fiber bundle (J). Then, a viewer turns UHF dial (16) on the television, and the first plate (I) is caused to turn. Various transparent areas on the first plate allow light to pass into various of the optic fibers. The optic fibers lighted show up through the transparent window (F) as channel digits at the digital read-out at the exterior of the television.

Although the prior art described above satisfies some of the objects to which optic fiber digital read-out devices are directed, the prior art still does not teach a digital measuring device which is trouble-free in operation, and is capable of the most cost-efficient production and the most covenient use.

SUMMARY OF THE INVENTION

Accordingly, it is an object of the present invention to provide a digital measuring device comprising relatively few parts, thus being trouble-free in operation while being capable of successfully detecting indicia on a movable graduated scale in order to obtain a digital reading of a measured length.

It is another object of the present invention to provide a digital measuring device which requries only an ambient light source (and no electronics) to sense or translate the light, thus providing cost-efficient production and eliminating the possibility of electronic malfunctions.

Finally, it is an object of the present invention to provide a digital measuring device which is practically and conveniently used, for example, as a belt to measure a person's waist or as a carpenter's tape measure.

To achieve the foregoing and other objects of the present invention and in accordance with the purpose of the invention there is generally provided a measuring device having a flexible, partially transparent band capable of being pulled centrally through an opening in a slide. Placed intermittently on the band are opaque measurement indicia. The slide houses a plurality of optic fibers with one end of each fiber terminating at a light-receiving panel at the slide exterior, and the other end of each fiber terminating at a digital read-out, also on the slide. The ends of the fibers at the read-out are arranged to preferably form, e.g., an "888" shape, from which all of the respective digits 0–999 may be formed.

In operation, the band is manually pulled through the opening in the slide until a particularly desired distance of band has passed through the slide. Light passes into the light receiving panel, through the transparent part of the band, through the optic fibers, and terminates at the digital read-out, which lights up a particular digit indicative of the distance measured.

The present invention uses any ambient light source available, e.g., fluorescent or incandesent room light or the sun. The optic fibers are capable of receiving the light source at the light receiving panel and transferring this light source directly through to the other end of the optic fibers which form a digital read-out. Notably, no electronic apparati are used in the present invention to translate the light energy into a digital read-out, as is the case with prior art structures.

In alternate embodiments of the present invention, the band and slide take the form of a belt-like device for measuring one's waist, or as a tape measure to be used by, e.g., a carpenter.

Overall, the present invention is a relatively simpler digital measuring device than the prior art devices discussed above. In addition, the present invention eliminates the disadvantages of the prior art digital measuring devices, such as a complicated assembly of parts, and a dependence upon electronic apparati or a self-contained light source. Further, the present invention is relatively compact, and is more conveniently used than the digital measuring devices known in the art.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
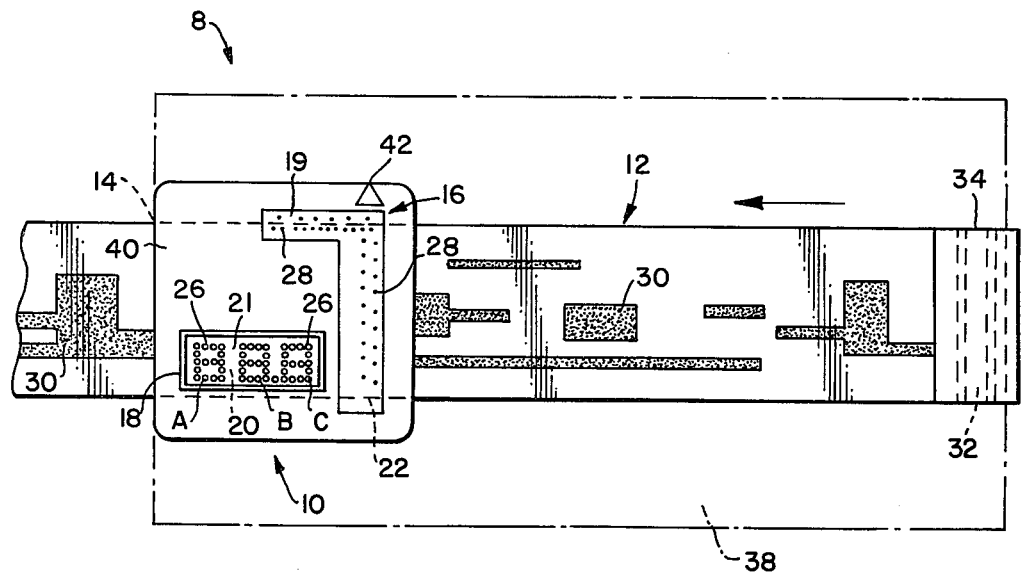
FIG 1 is a top sectional view of the preferred embodiment of the present invention, illustrating particularly the slide and the band.
Figure 2:
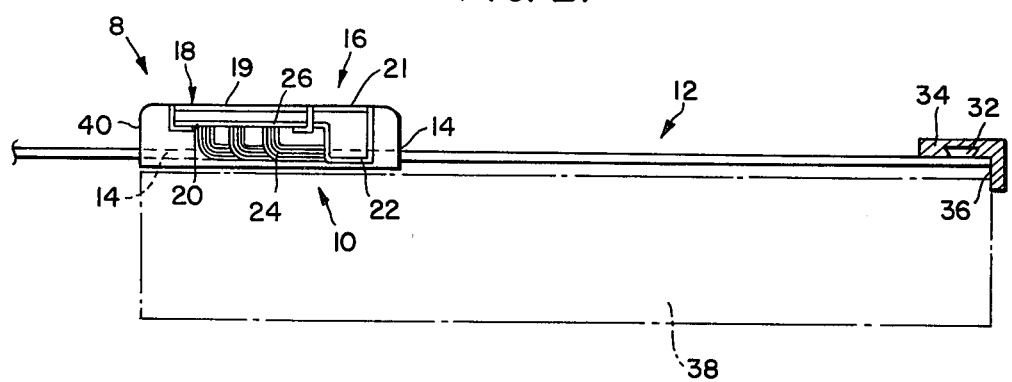
FIG. 2 is a side cross-sectional view of the slide and band illustrated in FIG. 1.

FIGS. 1 and 2 illustrate the preferred embodiment of the digital measuring device according to the present invention, denominated as reference numeral 8. The device 8 generally comprises a slide 10 and a band 12.

The slide 10 is preferably rigid and of a square or rectangular shape. The slide 10 has an opening 14 which extends centrally therethrough for receiving the band 12. On the exterior of the slide 10 there is provided a transparent light receiving panel 16 and a digital read-out panel 18, each of which is covered by a transparent sheet, 19 and 21, respectively. In the digital read-out panel 18 there is disposed an indicator plate 20 (see FIG. 2). In the light receiving panel 16 there is located a light receptor plate 22 (see FIG. 2). Extending between the indicator plate 20 and the light receptor plate 22 is a plurality of optic fibers 24. A first end 26 of each of the optic fibers 24 is implanted in the indicator plate 20 and the second ends 28 are bent and attached to the light receptor plate 22.

The light receiving panel 16 and the digital read-out panel 18 are preferably arranged in the same plane, so that visibility is facilitated. Alternatively, it is also possible to place the digital read-out panel 18 perpendicular to the indicator plate 20 by placing the digital read-out panel 18 on the side of the slide 10.

The plurality of optic fibers 24 are arranged in such a way that their ends 26 cumulatively form digits at the digital read-out 18 (see reference letters A, B and C in FIG. 1). The basic configuration of each of the digits A, B, C of the indicator plate 20 is an "8", and by excluding various optic fibers 24 within A, B, or C from a light source, one may obtain illumination of each digit from 0 to 9. Thus, each digit A, B and C is capable of displaying a different value in the sequence from 0-9. Together they represent in series the numbers 000-999.

On the band 12 there is formed opaque indicia 30. The positions of the opaque indicia 30 are directly proportional to the length in, e.g., millimeters, of the transparent band 12.

In operation, the band 12 is inserted in the opening 14 between the transparent sheet 21 and the light receptor plate 22, and when moved through the slide 10 part of the light receptor plate 22 becomes masked by the opaque indicia 30. By this selective masking of some of the optic fibers 24, it is possible to display by means of the optic fiber ends 26 a digital reading of the length of band 12 then extending from the slide 10.

The preferred embodiment also uses a projection 32 on one end of the band 12, to which an L-shaped removable attachment 34 is attached. The inner surface 36 of this L-shaped attachment 34 can be positioned to abut the edge of an object 38 to be measured. This inner surface 36 acts as one end of the distance measured, whereas the end 40 of the slide 10 which is slid to the other end of object 38 acts as the other end of the distance measured. When attachment 34 is not needed for measuring the object 38, the attachment 34 can be detached and set aside, and it is then possible to use the band 12 alone to measure any distance on the object 38.

As the measuring frame of reference, it is also possible to use, e.g., a projection 42 on the slide 10, instead of the end 40, as is shown in FIG. 1.

Besides being able to use this digital measuring device 8 for measuring objects having straight sides and edges, it is also possible to make use of its flexibility to measure circular or otherwise irregularly shaped objects.

In summary, as can be seen from the above explanation, this device 8 may be positioned by, e.g., a carpenter, along an object 38 to be measured, and by using ambient light, i.e., without any need for a self-contained light source, the object 38 can be measured and the measurement can be read at the digital read-out 18, providing an interesting, unique, practical and convenient digital measuring device.

Figure 3:
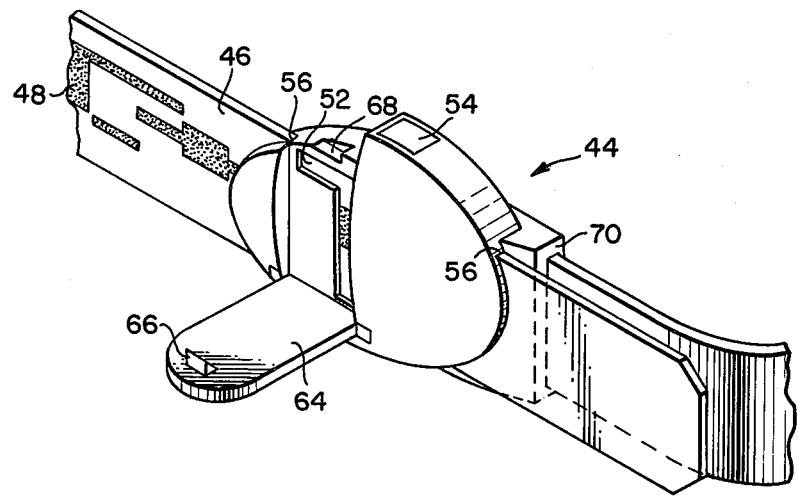
FIG. 3 is a perspective view of the buckle of an alternate embodiment of the present invention and the belt which is pulled through the buckle.
Figure 4:
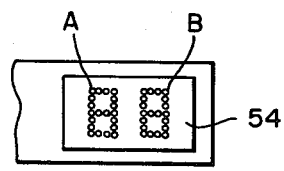
FIG. 4 is an enlarged view of a digital read-out panel according to the present invention.
Figure 5:
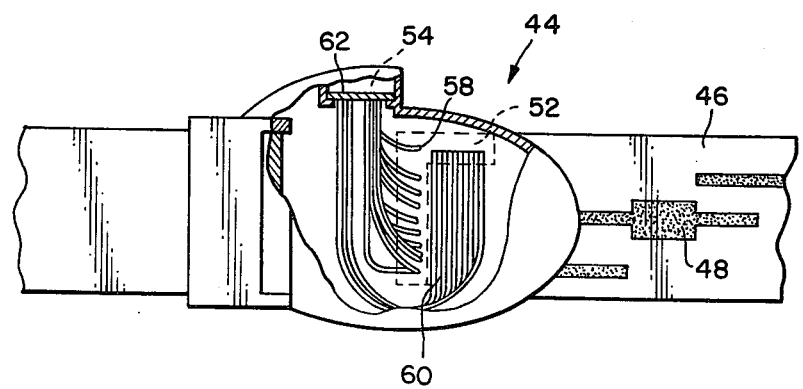
FIG. 5 is a partial cross-sectional view of the internal structure of the buckle shown in FIG. 3, illustrating particularly the configuration of the optic fibers.

FIGS. 3-5 illustrate an alternate embodiment of the present invention, generally comprising a belt-like digital measuring device 44 using a belt 46 and buckle 50. The buckle 50 receives the belt 46 through a continuous opening 56, such that it can be adjusted at will.

More particularly, FIGS. 3-5 illustrate a buckle 50 provided with a light receiving panel 52 and a digital read-out panel 54. The belt 46 is partially transparent and has opaque indicia 48 located thereon. The first ends 58 of optic fibers 60, each of which are capable of receiving and transmitting light, are embedded in the light receiving panel 52. Their second ends 62 are attached to the digital read-out panel 54 preferably in numerical configurations A and B (see FIG. 4).

The opaque indicia 48 are based on a continuum of possible waist sizes. The opaque indicia 48 mask certain optic fibers 60 embedded in the light receiving panel 52 to translate the appropriate waist size to the digital read-out panel 54.

The digital read-out panel 54 is covered in this embodiment by an opaque hinged door 64 having a fastening stud 66, which fits into a fastening stud slot 68 above the light receiving panel 52 to keep the hinged door 64 in a closed state when the device 44 is not in use. The hinged door 64 can be opened and closed at will (FIG. 3 shows the hinged door 64 in the open state).

As stated, there is a continuous opening 56 in the buckle 50, so that the belt 46 can be inserted into the buckle 50 and removed at will. In addition, on one side of buckle 50 there is provided a pivoted belt holder 70, so that one end of the belt 46 can be inserted into the holder 70, and secured.

As shown in FIG. 4, the optic fibers 60 are arranged so as to form digits, for example, in a row of two digits A and B. The configuration "8" is used as the generic number from which it is possible to produce the digits "0" through "9", as described above, by variable adjustment of the belt 46. Of course, by using two digits A and B, the possible total ranges from 00-99.

FIG. 5 illustrates buckle 50 in cross-section. As stated above, the first ends 58 of the plurality of optic fibers 60 are implanted in the light receiving panel 52. The optic fibers 60 are then bent and their second ends 62 are attached to the digital read-out panel 54.

The base measurement used in this embodiment for the opaque indicia 48 is centimeters. When the belt 46 moves across the light receiving panel 52, digital readings are formed at the digital read-out panel 52.

As a practical matter, for middle-aged and older people, 88 cm is the average measurement in a range of from 80 cm to 99 cm. The opaque indicia 48 are formed so that they are in proportion to the length of the belt 46, and apart from the opaque indicia 48 on the belt 46, no portion of the belt 46 inserted into buckle 50 gives any numerical indication at the digital read-out 54. But, when the belt 46 is appropriately worn, i.e., when an appropriate amount of belt 46 has been pulled through the buckle 50, waist size measurement values from 80 cm to 99 cm can be obtained.

In the case of younger age groups, 68 cm is made the average, with display values ranging from 50 cm to 69 cm being made possible by the opaque indicia 46. Particularly, in the case of younger women using the belt, the digital read-out 54 display may be formed to read in some type of women's clothing sizes—e.g., 8, 10 or 12. Using "sizes" provides a milder psychological shock than there would be from straight numerical measurements. It is, of course, possible to make other appropriate digital read-out configurations in terms of symbols, letters, or shapes.

In regards to the operation of the above-described, belt-like device, the belt 46, is pulled around the waist and through buckle 50. Next, with the finger, the user opens the hinged door 64; light then enters the light receiving panel 52, penetrates through the transparent portions of the belt 46, and by means of the optic fibers 60 the light is transmitted from the light receiving panel 52 to the digital read-out 54, where the measurement is displayed in a digital configuration.

By means of this device 44, as many times as the hinged door is opened when the belt is worn, one's waist size can be instantly measured. In addition, because the digital read-out can be positioned on the upper area of the buckle 50, the device is conveniently used and easily read by the user merely by looking down at the buckle 50. As suggested above, this device can be used by young people who worry about their weight in relation to physical attractiveness, and by older and middle aged people who are concerned about the relation between being overweight and having high blood pressure. Also, when buying clothing, as the need requires, the device can easily and simply be read and used, since only incident light from ambient surroundings is required, and no special light source is needed for instant viewing of waist measurements. This is an attractive feature to the user, who looks forward to the unique and interesting operation of the device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention and the appended claims and their equivalents.

I claim:

1. A device for measuring an object, comprising:
   (a) a slide having:
      (i) a light receiving panel,
      (ii) a digital read-out panel with a digital configuration therein,
      (iii) a plurality of optic fibers extending from the light receiving panel to the digital read-out panel, and
      (iv) an opening formed in the slide; and
   (b) an elongated substantially transparent band with opaque indica located thereon positioned in the opening, the opaque indicia corresponding to predetermined measured lengths of the band, wherein when the band is passed through the opening in the slide and across the light receiving panel, the opaque indicia mask some of the light while other light passes through the transparent area of the band and into certain of the plurality of optic fibers to selectively light the digital configuration at the digital read-out panel.

2. The device of claim 1, wherein the band has a first end and a second end, the first end having an L-shaped attachment for abutting an object to be measured.

3. The device of claim 2, wherein the light receiving panel and the digital read-out panel are in the same plane.

4. A digital waist measuring device, comprising:
   (a) a buckle having:
      (i) an ambient light receiving panel,
      (ii) a digital read-out panel with a digital configuration therein,
      (iii) a plurality of optic fibers each having a first end and a second end, the first end being connected to the light receiving panel and the second end being connected to the digital read-out panel, and
      (iv) a continuous opening formed in the buckle; and
   (b) an elongated substantially transparent belt with opaque indicia located thereon positioned in the opening, the opaque indicia corresponding to predetermined measured lengths of the belt, wherein when the belt is passed through the opening and across the light receiving panel the opaque indicia mask some of the ambient light while other ambient light passes through the transparent area of the belt and into certain of the plurality of optic fibers to selectively light the digital configuration at the digital read-out panel.

5. The device of claim 4, wherein the belt has a first end and a second end, the first end being fixedly attached to the buckle and the second end being a free end.

6. The device of claim 5, wherein the light receiving panel and the digital display panel are in perpendicular planes.

7. The device of claim 6, wherein the light receiving panel is covered by an opaque hinged door to selectively prevent light from passing into the light receiving panel.

* * * * *